(12) United States Patent
Tian et al.

(10) Patent No.: US 12,393,823 B2
(45) Date of Patent: Aug. 19, 2025

(54) DATA PROCESSING METHOD FOR NEURAL NETWORK ACCELERATOR, DEVICE AND STORAGE MEDIUM

(71) Applicant: BEIJING BAIDU NETCOM SCIENCE TECHNOLOGY CO., LTD., Beijing (CN)

(72) Inventors: Chao Tian, Beijing (CN); Lei Jia, Beijing (CN); Junhui Wen, Beijing (CN); Qiang Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 948 days.

(21) Appl. No.: 17/526,755

(22) Filed: Nov. 15, 2021

(65) Prior Publication Data

US 2022/0138528 A1    May 5, 2022

(30) Foreign Application Priority Data

Dec. 25, 2020    (CN) .......................... 202011566189.2

(51) Int. Cl.
*G06N 3/04* (2023.01)
*G06F 9/50* (2006.01)
(Continued)

(52) U.S. Cl.
CPC .............. *G06N 3/04* (2013.01); *G06F 9/5027* (2013.01); *G06F 17/15* (2013.01); *G06N 3/045* (2023.01);
(Continued)

(58) Field of Classification Search
CPC .......... G06N 3/04; G06N 3/045; G06N 3/063; G06N 3/061; G06N 3/0464; G06N 3/08;
(Continued)

(56) References Cited

U.S. PATENT DOCUMENTS

2018/0157969 A1* 6/2018 Xie .......................... G06F 7/57
2018/0189641 A1* 7/2018 Boesch .................. G06N 20/00
(Continued)

FOREIGN PATENT DOCUMENTS

CN    108446761 A    8/2018
CN    108734270 A    11/2018
(Continued)

OTHER PUBLICATIONS

Office Action of Japanese Application No. 2021-186754 dated Dec. 20, 2022, 8 pages.
(Continued)

*Primary Examiner* — Quoc A Tran
(74) *Attorney, Agent, or Firm* — Lippes Mathias LLP

(57) ABSTRACT

A data processing method for a neural network accelerator, an electronic device and a storage medium are provided. The technical solution includes: obtaining data to be processed and an operation to be executed; obtaining a real-number full-connection operation corresponding to the operation to be executed; and performing the real-number full-connection operation on the data based on a real-number full-connection unit of the neural network accelerator to obtain a result of the operation to be executed for the data.

17 Claims, 8 Drawing Sheets

(51) Int. Cl.
*G06F 17/15* (2006.01)
*G06N 3/045* (2023.01)
*G06N 3/0464* (2023.01)
*G06N 3/049* (2023.01)
*G06N 3/063* (2023.01)
*G06N 3/08* (2023.01)

(52) U.S. Cl.
CPC .......... *G06N 3/0464* (2023.01); *G06N 3/049* (2013.01); *G06N 3/063* (2013.01); *G06N 3/08* (2013.01)

(58) Field of Classification Search
CPC ....... G06N 3/049; G06F 9/5027; G06F 17/15; Y02D 10/00; G01N 29/4481; G01N 33/0034
See application file for complete search history.

(56) References Cited

U.S. PATENT DOCUMENTS

| | | | |
|---|---|---|---|
| 2019/0114529 | A1 | 4/2019 | Ng et al. |
| 2020/0218967 | A1* | 7/2020 | Strachan ................. G06N 3/08 |
| 2020/0242189 | A1 | 7/2020 | Chatterjee et al. |
| 2021/0312325 | A1* | 10/2021 | Abdelaziz ............. G06N 20/00 |

FOREIGN PATENT DOCUMENTS

| | | |
|---|---|---|
| CN | 109543830 A | 3/2019 |
| CN | 110717588 A | 1/2020 |
| CN | 110807522 A | 2/2020 |
| CN | 111047008 A | 4/2020 |
| CN | 111325332 A | 6/2020 |
| JP | 2020126662 A | 8/2020 |
| KR | 20180028966 A | 3/2018 |

OTHER PUBLICATIONS

Zheng Qin et al.: "Diagonalwise Refactorization: An Efficient Training Method for Depthwise Convolutions", 2018 International Joint Conference on Neural Networks (IJCNN), Jul. 8, 2018, 9 pages.
Chiheb Trabelsi et al.: "Deep Complex Networks", ICLR 2018 Conference, Feb. 25, 2018, 1 pages.
Office Action for Chinese Application No. 202011566189.2, dated Jun. 29, 2023, 24 pages.
Huang, Jiaming, et al.; "An Infrared Object Detection Neural Network Accelerator Based on FPGA"; Flight Control & Detection; vol. 3, No. 6; Nov. 30, 2020; 10 pages.

* cited by examiner

DATA PROCESSING METHOD FOR NEURAL NETWORK ACCELERATOR, DEVICE AND STORAGE MEDIUM

CROSS-REFERENCE TO RELATED APPLICATIONS

This application claims the benefit of priority to Chinese Application No. 202011566189.2, filed on Dec. 25, 2020, the contents of which are incorporated herein by reference in their entirety.

TECHNICAL FIELD

The present disclosure relates to a field of computer technologies, specifically to a field of artificial intelligence (AI) technologies such as big data and deep learning (DL), and particularly to a data processing method for a neural network accelerator, an electronic device and a storage medium.

BACKGROUND

A convolution unit, and a full-connection unit, etc. may be configured in a neural network accelerator. However, more and more units configured in the neural network accelerator easily make more and more areas of a chip of the neural network accelerator be occupied and consume more and more hardware resources, resulting in failing to process data (such as voice data) in the neural network accelerator. Therefore, how to better achieve data processing of the neural network accelerator is an urgent problem to be solved.

SUMMARY

The present disclosure relates to a data processing method and apparatus for a neural network accelerator, an electronic device and a storage medium.

According to a first aspect of the present disclosure, a data processing method for a neural network accelerator is provided. The method includes: obtaining data to be processed and a first operation to be executed; obtaining a real-number full-connection operation corresponding to the first operation; and performing the real-number full-connection operation on the data based on a real-number full-connection unit of the neural network accelerator to obtain a result of the first operation for the data.

According to a second aspect of the present disclosure, an electronic device is provided. The device includes: at least one processor; and a memory communicatively coupled to at least one processor. The memory stores instructions executable by the at least one processor, and the instructions are executed by the at least one processor, so that the at least one processor can execute the data processing method for a neural network accelerator according to the first aspect of the present disclosure.

According to a third aspect of the present disclosure, a non-transitory computer-readable storage medium storing computer instructions is provided. The computer instructions are configured to cause a computer to execute the data processing method for a neural network accelerator according to the first aspect.

It should be understood that, the content described in the part is not intended to recognize key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

FIG. 3-1 is a flowchart illustrating a data processing method for a neural network accelerator according to another embodiment of the present disclosure;

FIG. 3-2 is a schematic diagram illustrating a correlation between a convolution operation and a full-connection operation according to an embodiment of the present disclosure;

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

In the related art, a convolution unit, a full-connection unit, etc. may be configured in a neural network accelerator. However, more and more units configured in the neural network accelerator easily make more and more areas of a chip of the neural network accelerator be occupied and consume more and more hardware resources, resulting in failing to process the data (such as voice data) in the neural network accelerator. Therefore, it is a current urgent technical problem to be solved that the chip is designed to use as few hardware resources as possible or the same hardware resources are used to implement more operations.

In order to solve the above problem, the present disclosure provides a data processing method and apparatus for a neural network accelerator, an electronic device and a storage medium. In the present disclosure, after to-be-processed data and a corresponding to-be-executed operation are obtained, a real-number full-connection operation corresponding to the to-be-executed operation is obtained, and the real-number full-connection operation is performed on the to-be-processed data according to a real-number full-connection unit of the neural network accelerator to obtain a result of the to-be-executed operation for the to-be-processed data. In this way, any operation of the to-be-processed data may be implemented by the real-number full-connection unit of the neural network accelerator, thereby achieving reuse of the real-number full-connection unit and performing multiple operations in the case of minimum hardware logics.

A data processing method and apparatus for a neural network accelerator, an electronic device and a storage medium will be described below with reference to the accompanying drawings.

Figure 1:
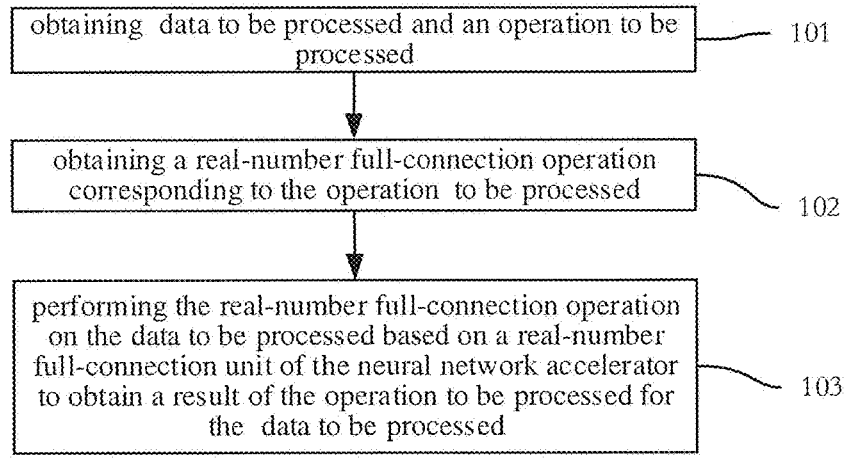
FIG. 1 is a flowchart illustrating a data processing method for a neural network accelerator according to an embodiment of the present disclosure.

FIG. 1 is a flowchart illustrating a data processing method for a neural network accelerator according to an embodiment of the present disclosure. It should be noted that, the data processing method for a neural network accelerator in embodiments of the present disclosure may be applied to a data processing apparatus for a neural network accelerator in embodiments of the present disclosure. The apparatus may be a hardware device or software of a hardware device, and the apparatus may be applied to an electronic device, in which, the electronic device may include a terminal or a server, for example, a mobile terminal including a smart phone, a tablet computer, a PAD, a personal digital assistant, etc., which is not limited in embodiments of the present disclosure.

At S101, data to be processed and an operation to be executed are obtained.

In the embodiment of the present disclosure, the data to be processed (also called to-be-processed data) and the corresponding operation to be executed (also called to-be-executed operation) in the neural network accelerator may be obtained by an electronic device.

It should be noted that a neural network may be understood as performing computations by a large number of connected artificial neurons, which is a non-linear statistical data modeling tool. The neural network includes three parts: 1) Architecture, specifying variables in the network and their topology relations. For example, variables in the neural network may be weights of connections between neurons and activities of the neurons; 2) Activity Rule, a majority of neural network models have a dynamic rule of a short time scale to define how the neuron changes its own activity according to activities of other neurons. The general activity function depends on the weights in the network (that is, parameters of the network); 3) Learning Rule, specifying how the weights in the network are adjusted over time. It is regarded as a dynamic rule of a long time scale. In general, the learning rule depends on the activities of the neurons. It may also rely on a target value provided by the supervisor and current weights. For example, a neural network for handwriting recognition has a set of input neurons. The input neurons may be activated by data of an input image. After activities are weighted and go through a function (determined by the designer of the network), the activities of the neurons are conveyed to other neurons. The process is repeated till output neurons are activated. Finally, activities of the output neurons determine which letter is recognized.

Based on the above neural network, a server may be set up at the cloud side to provide artificial intelligence services, but also it may be applied to a smart phone, an intelligent security and even an intelligent vehicle to achieve tasks such as image recognition, object tracking and voice recognition. Due to their different application scenarios and a limitation of algorithm features, it is required to provide a low power and efficient chip specially designed to run a neural network algorithm, that is, a neural network accelerator.

For example, in an embodiment of the present disclosure, the to-be-processed data may be voice frequency domain data, in which the voice frequency domain data may be data obtained by frequency domain conversion of voice data, and the to-be-performed operation for voice frequency domain conversion may be a complex convolution operation, a complex full-connection operation, a real-number group convolution operation, a real-number convolution operation, etc.

At S102, a real-number full-connection operation corresponding to the operation to be executed is obtained.

That is, after the to-be-processed data and the corresponding to-be-executed operation are obtained, the real-number full-connection operation corresponding to the to-be-executed operation may be obtained.

Different to-be-executed operations correspond to different real-number full-connection operations. The specific implementation process may refer to the subsequent embodiments.

At S103, the real-number full-connection operation is performed on the data to be processed based on a real-number full-connection unit of the neural network accelerator to obtain a result of the operation to be processed for the data to be processed.

For example, after the real-number full-connection operation corresponding to the to-be-executed operation is obtained, the real-number full-connection operation may be performed on the obtained voice frequency domain data according to the real-number full-connection unit of the neural network accelerator to obtain the result of the to-be-executed operation for the to-be-processed data.

According to the data processing method for a neural network accelerator in embodiments of the present disclosure, to-be-processed data and a corresponding to-be-executed operation are obtained, a real-number full-connection operation corresponding to the to-be-executed operation is obtained, and the real-number full-connection operation on the to-be-processed data is performed according to a real-number full-connection unit of the neural network accelerator to obtain a result of the to-be-executed operation for the to-be-processed data. In this way, any operation of the to-be-processed data may be implemented by the real-number full-connection unit of the neural network accelerator, thereby achieving reuse of the real-number full-connection unit and performing multiple operations in the case of minimum hardware logics.

Figure 2:
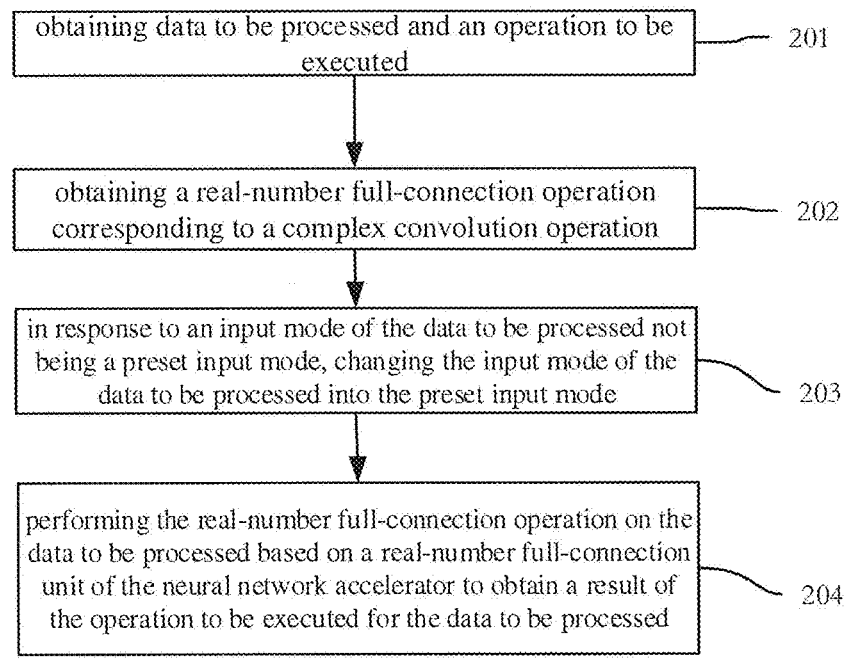
FIG. 2 is a flowchart illustrating a data processing method for a neural network accelerator according to an embodiment of the present disclosure.

In order to make those skilled in the art easily understand the present disclosure, the present disclosure provides a data processing method for a neural network accelerator in a specific embodiment. It should be noted that the data processing method for a neural network accelerator in the specific embodiment is a further refinement or optimization of the first embodiment. Taking the obtained to-be-executed operation being a complex convolution operation for an example, FIG. 2 is a flowchart illustrating a data processing method for a neural network accelerator according to a specific embodiment of the present disclosure. As illustrated in FIG. 2, the data processing method for a neural network accelerator may include the following.

At S201, data to be processed and an operation to be processed are obtained.

For example, the data to be processed (also called to-be-processed data) may be voice frequency domain data, in which the voice frequency domain data may be data obtained by frequency domain conversion of voice data, and the operation to be processed (also called to-be-performed operation) for voice frequency domain conversion is a complex convolution operation.

At S202, a real-number full-connection operation corresponding to the complex convolution operation is obtained.

In an embodiment of the present disclosure, when the to-be-processed operation is a complex convolution operation, a complex weight matrix corresponding to the complex convolution operation may be obtained, the complex weight matrix may be split to obtain a real part weight matrix and an imaginary part weight matrix, a real-part full-connection operation is determined based on the real part weight matrix, an imaginary-part full-connection operation is determined based on the imaginary part weight matrix, and the real-part full-connection operation is combined with the imaginary-part full-connection operation to obtain the real-number full-connection operation.

At S203, in response to an input mode of the data to be processed not being a preset input mode, the input mode of the data to be processed is changed into the preset input mode.

At S204, the real-number full-connection operation is performed on the data to be processed based on a real-number full-connection unit of the neural network accelerator to obtain a result of the operation to be processed for the data to be processed.

In an embodiment of the present disclosure, after the real-number full-connection operation corresponding to the complex convolution operation is obtained, and the input mode of the to-be-processed data is changed into the preset input mode, the real-part full-connection operation may be performed on the data to be processed based on the real-number full-connection unit of the neural network accelerator to obtain a real part result, and the imaginary-part full-connection operation is performed on the data to be processed based on the real-number full-connection unit of the neural network accelerator to obtain an imaginary part result, and the result is generated based on the real part result and the imaginary part result.

According to the data processing method for a neural network accelerator in embodiments of the present disclosure, by obtaining to-be-processed data and a corresponding to-be-executed operation, obtaining a real-number full-connection operation corresponding to the to-be-executed operation, changing an input mode of the to-be-processed data into a preset input mode in the case of the input mode of the to-be-processed data not being the preset input mode, and performing the real-number full-connection operation on the to-be-processed data according to a real-number full-connection unit of the neural network accelerator to obtain a result of the to-be-executed operation for the to-be-processed data, the real-number full-connection operation corresponding to the complex convolution opera- tion of the to-be-processed data may be implemented by the real-number full-connection unit of the neural network accelerator, thereby achieving reuse of the real-number full-connection unit and performing multiple operations in the case of minimum hardware logics.

Figures 1, 3:
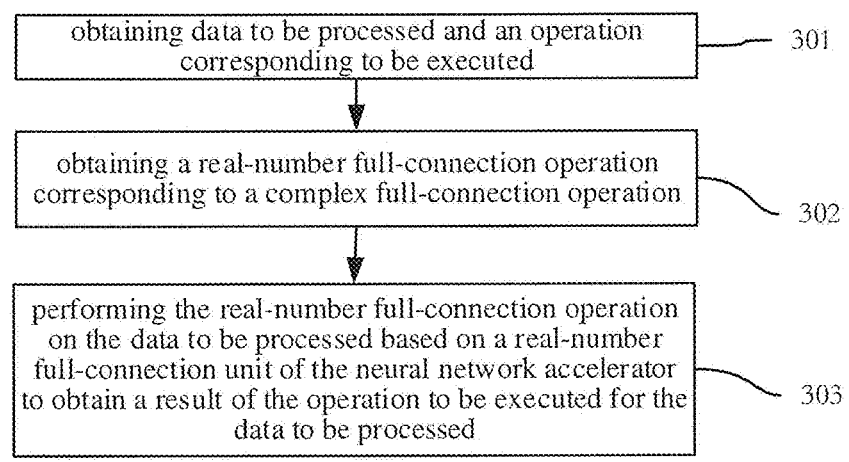
Figures 2, 3:
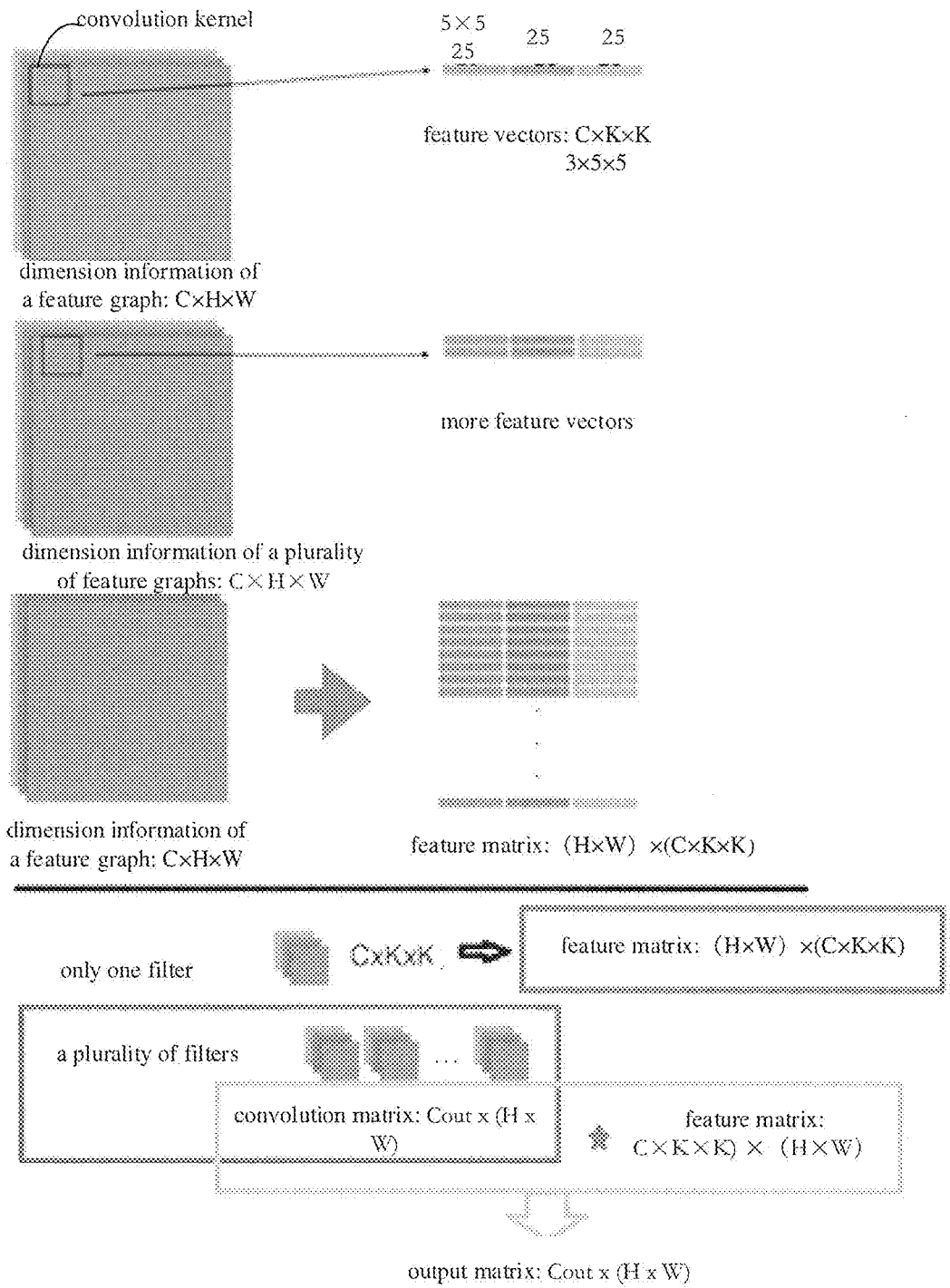

In order to make those skilled in the art easily understand the present disclosure, the present disclosure provides a data processing method for a neural network accelerator in a specific embodiment. It should be noted that the data processing method for a neural network accelerator in the specific embodiment is a further refinement or optimization of the first embodiment. Taking the to-be-executed operation being a complex full-connection operation for an example, FIG. 3-1 is a flowchart illustrating a data processing method for a neural network accelerator according to another embodiment of the present disclosure. As illustrated in FIG. 3-1, the data processing method for a neural network accelerator may include the following.

At S301, data to be processed and an operation to be processed are obtained.

For example, the data to be processed (also called to-be-processed data) may be voice frequency domain data, in which the voice frequency domain data may be data obtained by frequency domain conversion of voice data, and the operation to be processed (also called to-be-performed operation) for voice frequency domain conversion is a complex full-connection operation.

At S302, a real-number full-connection operation corresponding to the complex full-connection operation is obtained.

In an embodiment of the present disclosure, when the to-be-processed operation obtained is a complex full-connection operation, a complex weight matrix corresponding to the complex full-connection operation may be obtained, the complex weight matrix may be split to obtain a real part weight matrix and an imaginary part weight matrix, a real-part full-connection operation is determined based on the real part weight matrix, an imaginary-part full-connection operation is determined based on the imaginary part weight matrix, and the real-part full-connection operation is combined with the imaginary-part full-connection operation to obtain the real-number full-connection operation.

At S303, the real-number full-connection operation is performed on the data to be processed based on a real-number full-connection unit of the neural network accelerator to obtain a result of the operation to be processed for the data to be processed.

That is, after the real-number full-connection operation corresponding to the complex full-connection operation is obtained, the real-number full-connection operation corresponding to the complex full-connection operation may be performed on the to-be-processed data according to the real-number full-connection unit of the neural network accelerator to obtain the result of the to-be-executed operation for the to-be-processed data.

It should be noted that there is a relation between a convolution operation and a full-connection operation, that is, the convolution operation and the full-connection operation may be converted to each other, that is, a convolution operation may be converted into a full-connection operation.

For example, as illustrated in FIG. 3-2, dimension information of a feature graph $C \times H \times W$ corresponds to a feature vector $C \times K \times K$, and dimension information of a plurality of feature graphs $C \times H \times W$ corresponds to a plurality of feature vectors. The entire feature graph is processed to obtain a feature matrix $(H \times W) \times (C \times K \times K)$, in which, $H \times W$ represents a dimension of a convolution kernel, and when a filter exists, it corresponds to a feature matrix: (H×W)×(C×K×K), and when a plurality of filters exist, it corresponds to a convolution matrix of the plurality of filters, the convolution matrix Cout×(H×W) is multiplied by the feature matrix (C×K×K)×(H×W) to obtain an output matrix. In the term of CNN, a matrix of 3×3 is called a "filter", or "kernel", or "feature detector".

One exemplary explanation is as follows: a conventional convolution operation may extract data from the input data according to the size of a convolution kernel, taking 5×5 in FIG. 3-2 for an example, each channel may extract 25 pixels, and three channels extract 3×5×5=75 pixels, a dot product operation may be performed on the 75 pixels and one convolution Kernel (core) to generate one output point which may be calculated with C' convolution kernels to generate and output C' points at the same position of the channels. That is, an operation is determined, which is equivalent to the operation of vector matrix multiplication with an input dimension of 75 and an output dimension of C'.

im2col operation is performed to extract an input of a position, in which, an output of the position may be understood as an output of a certain point computed in the convolution, and the position refers to the point, and a dot product is performed on the output and C' convolution kernels to output C' values, which are respectively stored in the same position of different channels, and by analogy, the convolution operation may be deduced into a combination of a plurality of full-connection operations and an im2col operation.

The function of the convolutional layer in the neural network is to extract features, and there may be many convolutional layers connected in series to extract features of higher dimensions, for example, VGG model extraction. In an implementation of a network processing unit (NPU), in order to optimize efficiency, the input format is not a format of CHW (C (Channel), H (Height), W (Width)), but its transpose in a format of HWC (H(Height), W (Width), C (Channel)). The output may also be converted into the format of HWC, which facilitates calling by the next layer of the convolution layer. In this case, the data in the input direction W*C is continuous. Only the data memory of the convolution kernel in the H direction is continuous, and in order to make the memory occupied by each row of the input data be w*c, a point at the same position W of the next row is obtained and the input data needs to add one Stride (step length). For software, address operation needs to be performed for the non-continuous, such that the flow line is interrupted, resulting in efficiency loss. For an IC design, one more corresponding address control unit may be placed to prevent from the efficiency loss, such that the efficiency may be the same as that of the normal full-connection operation.

Therefore, the input in the format of HWC in combination with a self-added address counter of the NPU may implement the work with the same efficiency as vector multiplication matrix without adding the im2col which causes a low efficiency.

It should be noted that, in the above embodiments of the present disclosure, in the complex convolution operation and the complex full connection operation, the complex operation needs to be implemented by a standard complex unit, which increases the area and power consumption of the integrated circuit chip (IC). However, the complex full connection may have a variation. First, multiplication and addition operations of the complex may be represented by:

$$R \cdot r\mathrel{+}= A \cdot r * B \cdot r - A \cdot i * B \cdot i;$$

$$R \cdot i\mathrel{+}= * B \cdot i + A \cdot i * B \cdot r;$$

R represents a real part, i represents an imaginary part, A is an input vector, and B is a weight matrix. If the A is maintained unchanged, and the weight matrix B is preprocessed by assigning all imaginary parts in the first row of the weight matrix to negative values and then interchanging the real part and the imaginary part in the second row of the weight matrix, a dot product operation of the complex may be performed directly by means of a real number dot product method. The operation of a weight matrix of M*N may be regarded as an operation of a real-number matrix of 2M*2N. In this way, the storage space of the weight matrix may double. In the voice operation, the memory for the complex convolution operation and the complex full-connection operation is on the order of magnitudes of hundreds of KB, and the NPU memory is designed on the order of magnitudes of MB, such that the expansion of storage space is acceptable, which brings advantages that the input is directly treated as a real number and the hardware needs not add a new operation logic. The problem of complex operation is effectively solved, and under the same architecture of dot product operation, real-number operation and complex operation may be supported at the same time.

For example, the operation of a weight matrix of M*N may be treated as the operation of a real-number matrix of 2M*2N as follows. For example, an operation of a complex matrix of 1×1, may be modified as an operation of a real matrix of 2×2, in which the weights of the first row are B·r and −B·i, and the weights of the second row are B·i and B·r, so that the output R·r and R·i nay be obtained by performing a matrix operation with a two-dimensional input A·r, A·i.

According to the data processing method for a neural network accelerator in embodiments of the present disclosure, a real-number full-connection operation corresponding to a complex full-connection operation of the to-be-processed data may be implemented by the real-number full-connection unit of the neural network accelerator, thereby achieving reuse of the real-number full-connection unit and performing the real-number full-connection operation in the case of minimum hardware logics.

Figure 4:
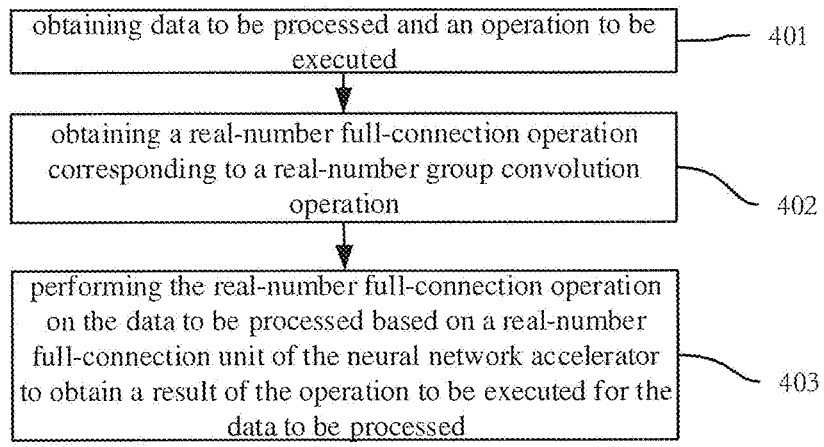
FIG. 4 is a flowchart illustrating a data processing method for a neural network accelerator according to another embodiment of the present disclosure.

In order to make those skilled in the art easily understand the present disclosure, the present disclosure provides a data processing method for a neural network accelerator in a specific embodiment. It should be noted that the data processing method for a neural network accelerator in the specific embodiment is a further refinement or optimization of the first embodiment. Taking the to-be-executed operation being a grouped real-number convolution operation for an example, FIG. 4 is a flowchart illustrating a data processing method for a neural network accelerator according to another embodiment of the present disclosure. As illustrated in FIG. 4, the data processing method for a neural network accelerator may include the following.

At S401, data to be processed and an operation to be processed are obtained.

For example, the data to be processed (also called to-be-processed data) may be voice frequency domain data, in which the voice frequency domain data may be data obtained by frequency domain conversion of voice data, and the operation to be processed (also called to-be-performed operation) for voice frequency domain conversion is a real-number group convolution operation.

At S402, a real-number full-connection operation corresponding to the real-number group convolution operation is obtained.

In an embodiment of the present disclosure, when the to-be-processed operation is the real-number group convolution operation, a first weight matrix of the real-number group convolution operation may be obtained and processed to obtain a second weight matrix corresponding to a real-number convolution operation corresponding to the real-number group convolution operation, and further the real-number full-connection operation may be determined according to the second weight matrix.

At S403, the real-number full-connection operation is performed on the data to be processed based on a real-number full-connection unit of the neural network accelerator to obtain a result of the operation to be processed for the data to be processed.

That is, after the real-number full-connection operation corresponding to the real-number group convolution operation is obtained, the real-number full-connection operation corresponding to the real-number group convolution operation may be performed on the to-be-processed data according to the real-number full-connection unit of the neural network accelerator to obtain the result of the to-be-executed operation for the to-be-processed data.

It should be noted that, in the above embodiments, a real-number group convolution is a method that reduces convolution parameters and convolution computation overhead. A group convolution is not suitable for computation of a Neural-network Processing Unit (NPU). If a dedicated group convolution is added, the complexity of hardware design of the NPU may be increased. In an actual model, the most commonly used group convolution is a depthwise separable convolution, which may be obtained by a common vector multiplication and addition. It is supported in the NPU. For example, for a group convolution of group!=C or C', the weight may be preprocessed to obtain a conventional convolution. The group convolution may be understood as follows. In the input channel C, each group has D=C/group channels, and these channels and a convolution kernel are convoluted to obtain an output value. The number of parameters of each convolution kernel is KernelH*KernelW*D. If the weight is adjusted to cause the number of parameters of each convolution kernel to be KernelH*KernelW*C, the parameters of the convolution kernels not for channel D are all 0, the obtained result is the same as the result obtained by performing the group convolution separately, and the difference is addition of computation amount. However, for the NPU, the group convolution is changed to the conventional convolution. Since the number of parameters of the convolution itself is very small, it is feasible to restore the number of parameters to the size of C (channel). In this way, the complexity of the core hardware logic of the NPU IP is reduced and the design is more universal, which avoids necessity to support the group convolution of different GroupNumbers and design hardwares for them.

Therefore, a group convolution converts the weight to a weight of a conventional convolution, and the essence of the group convolution is to compress the convoluted weight. When it is converted to the weight of a conventional convolution, the value of weights of other groups are all 0. The purpose is to use the same set of hardware logics, since a vector unit of the NPU is very strong, which may be dedicated to optimizing the conventional convolution.

According to the data processing method for a neural network accelerator in embodiments of the present disclosure, a real-number full-connection operation corresponding to a real-number group convolution operation of the to-be-processed data may be implemented by the real-number full-connection unit of the neural network accelerator, thereby achieving reuse of the real-number full-connection unit and performing the real-number full-connection operation in the case of minimum hardware logics.

Figure 5:
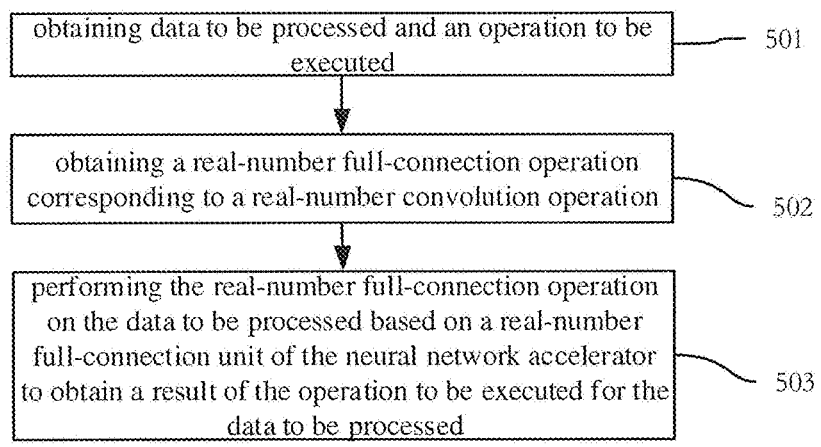
FIG. 5 is a flowchart illustrating a data processing method for a neural network accelerator according to another embodiment of the present disclosure.

In order to make those skilled in the art easily understand the present disclosure, the present disclosure provides a data processing method for a neural network accelerator in s specific embodiment. It should be noted that the data processing method for a neural network accelerator in the specific embodiment is a further refinement or optimization of the first embodiment. Taking the to-be-executed operation being a real-number convolution operation for an example, FIG. 5 is a flowchart illustrating a data processing method for a neural network accelerator according to another embodiment of the present disclosure. As illustrated in FIG. 5, the data processing method for a neural network accelerator may include the following.

At S501, data to be processed and an operation to be processed are obtained.

For example, the data to be processed (also called to-be-processed data) may be voice frequency domain data, in which the voice frequency domain data may be data obtained by frequency domain conversion of voice data, and the operation to be processed (also called to-be-performed operation) for voice frequency domain conversion is a real-number convolution operation.

At S502, a real-number full-connection operation corresponding to the real-number convolution operation is obtained.

In an embodiment of the present disclosure, when the to-be-processed operation obtained is the real-number convolution operation, at least one weight matrix of the real-number convolution operation may be obtained, and the real-number full-connection operation may be determined according to the at least one weight matrix.

At S503, the real-number full-connection operation is performed on the data to be processed based on a real-number full-connection unit of the neural network accelerator to obtain a result of the operation to be processed for the data to be processed.

That is, after the real-number full-connection operation corresponding to the to-be-executed operation is obtained, the real-number full-connection operation may be performed on the to-be-processed data according to the real-number full-connection unit of the neural network accelerator to obtain the result of the to-be-executed operation for the to-be-processed data.

According to the data processing method for a neural network accelerator in embodiments of the present disclosure, a real-number full-connection operation corresponding to a real-number convolution operation of the to-be-processed data may be implemented by the real-number full-connection unit of the neural network accelerator, thereby achieving reuse of the real-number full-connection unit and performing the real-number full-connection operation in the case of minimum hardware logics.

Corresponding to the data processing method for a neural network accelerator provided by the above embodiments, the embodiments of the present disclosure further provide a data processing apparatus for a neural network accelerator. Since the data processing apparatus for a neural network accelerator provided in the embodiments of the present disclosure corresponds to the data processing method for a neural network accelerator provided in the above embodiments of the present disclosure, the implementation of the data processing method for a neural network accelerator also applies to the data processing apparatus for a neural network accelerator provided in the embodiment, which will not be described in the embodiment.

Figure 6:
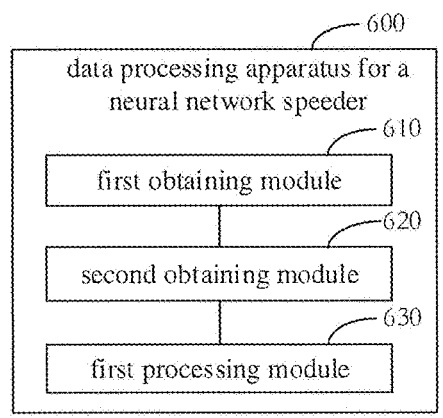
FIG. 6 is a block diagram illustrating a data processing apparatus for a neural network accelerator according to an embodiment of the present disclosure.

FIG. 6 is a diagram illustrating a data processing apparatus for a neural network accelerator according to the present disclosure. As illustrated in FIG. 6, the data processing apparatus 600 for a neural network accelerator may include a first obtaining module 610, a second obtaining module 620 and a first processing module 630.

The first obtaining module 610 is configured to obtain data to be processed and a first operation to be executed.

The second obtaining module 620 is configured to obtain a real-number full-connection operation corresponding to the first operation.

The first processing module 630 is configured to perform the real-number full-connection operation on the data based on a real-number full-connection unit of the neural network accelerator to obtain a result of the first operation for the data. As an example, the first processing module is configured to perform the real-part full-connection operation on the data based on the real-number full-connection unit to obtain a real part result; perform the imaginary-part full-connection operation on the data based on the real-number full-connection unit to obtain an imaginary part result; and generate the result based on the real part result and the imaginary part result.

Figure 7:
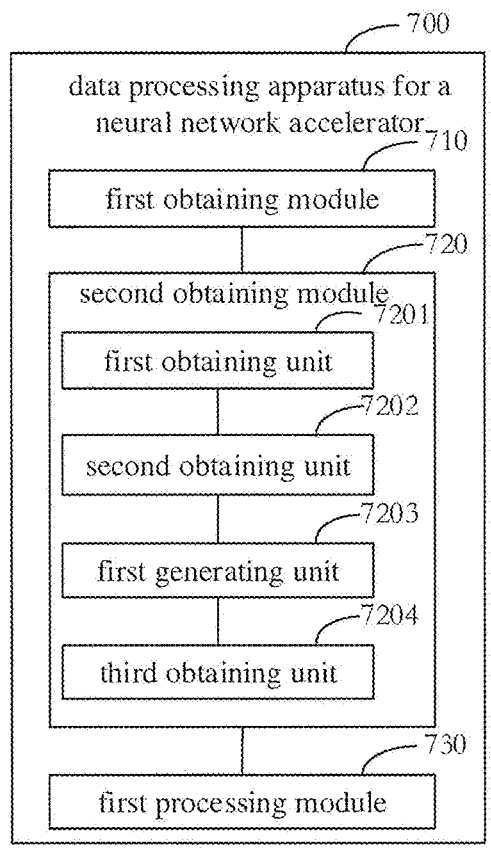
FIG. 7 is a block diagram illustrating another data processing apparatus for a neural network accelerator according to an embodiment of the present disclosure.

In one embodiment of the present disclosure, as illustrated in FIG. 7, when the first operation is a complex convolution operation, the second obtaining module 720 includes: a first obtaining unit 7201, configured to obtain a complex weight matrix corresponding to the complex convolution operation; a second obtaining unit 7202, configured to split the complex weight matrix to obtain a real part weight matrix and an imaginary part weight matrix; a first generating unit 7203, configured to determine a real-part full-connection operation based on the real part weight matrix, and determine an imaginary-part full-connection operation based on the imaginary part weight matrix; and a third obtaining unit 7204, configured to combine the real-part full-connection operation with the imaginary-part full-connection operation to obtain the real-number full-connection operation.

Modules 710 to 730 in FIG. 7 have the same function and structure as modules 610 to 630 in FIG. 6.

Figure 8:
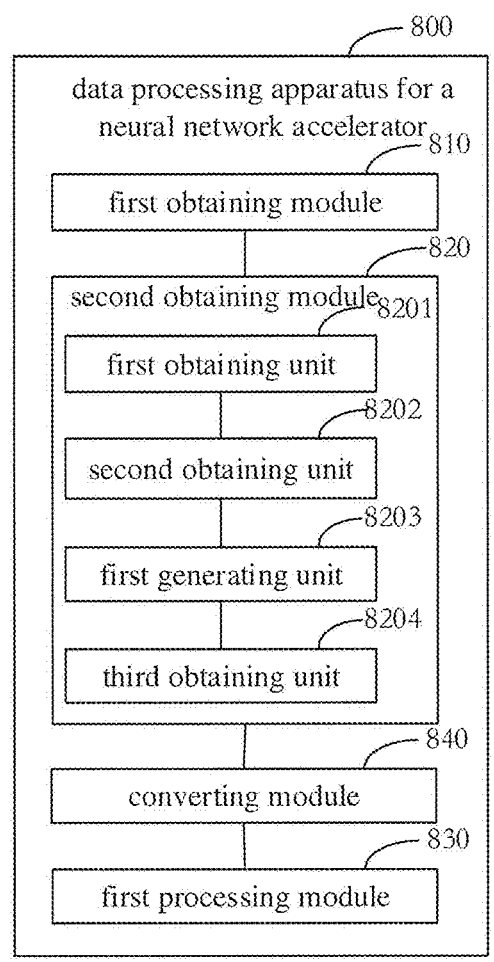
FIG. 8 is a block diagram illustrating another data processing apparatus for a neural network accelerator according to an embodiment of the present disclosure.

In an embodiment of the present disclosure, as illustrated in FIG. 8, the apparatus further includes a converting module 840, configured to, in response to an input mode of the data not being a preset input mode, change the input mode of the data into the preset input mode.

Modules 810 to 830 in FIG. 8 have the same function and structure with modules 710 to 730 in FIG. 7.

Figure 9:
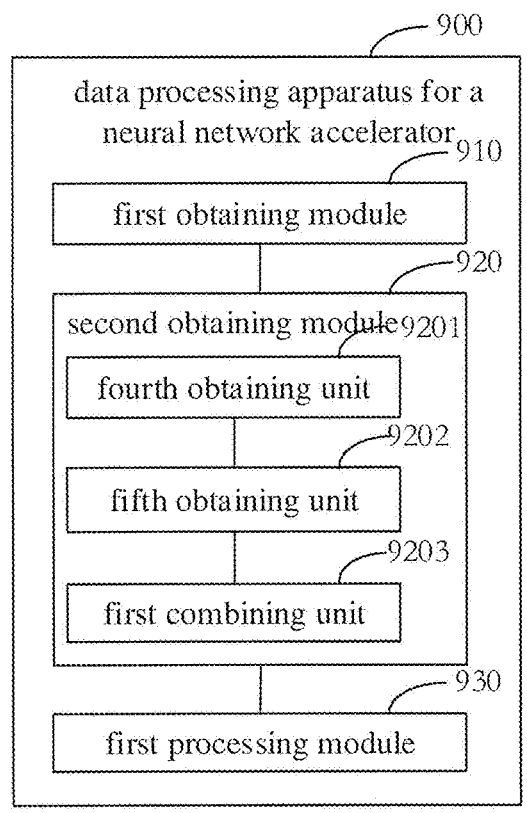
FIG. 9 is a block diagram illustrating another data processing apparatus for a neural network accelerator according to an embodiment of the present disclosure.

In an embodiment of the present disclosure, as illustrated in FIG. 9, when the first operation is a complex full-connection operation, the second obtaining module 920 includes: a fourth obtaining unit 9201, configured to obtain a complex weight matrix corresponding to the complex full-connection operation; a fifth obtaining unit 9202, configured to split the complex weight matrix to obtain a real part weight matrix and an imaginary part weight matrix; a second generating unit 9203, configured to determine a real-part full-connection operation based on the real part weight matrix, and determine an imaginary-part full-connection operation based on the imaginary part weight matrix; and a first combining unit 9204, configured to combine the real-part full-connection operation with the imaginary-part full-connection operation to obtain the real-number full-connection operation.

Modules 910 to 930 in FIG. 9 have the same function and structure with modules 610 to 630 in FIG. 6.

In an embodiment of the present disclosure, when the first operation is a real-number group convolution operation, the second obtaining module 1020 includes: a sixth obtaining unit 10201, configured to obtain a first weight matrix of the real-number group convolution operation; a seventh obtaining unit 10202, configured to process the first weight matrix to obtain a second weight matrix corresponding to a real-number convolution operation corresponding to the real-number group convolution operation; a third generating unit 10203, configured to determine the real-number full-connection operation based on the second weight matrix.

Figure 10:
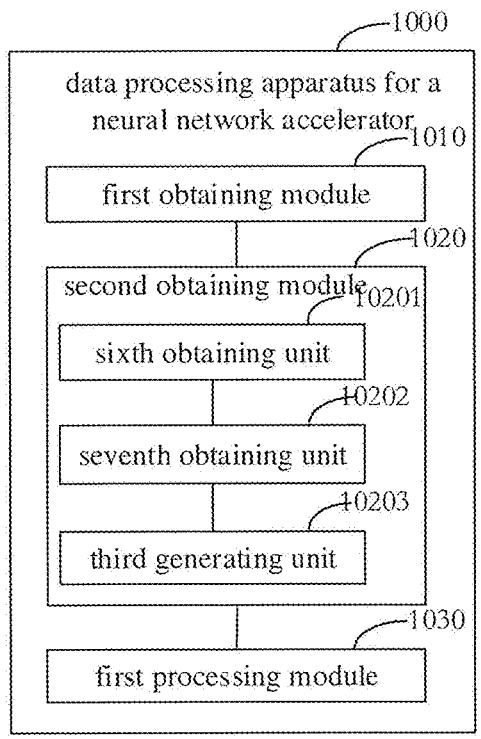
FIG. 10 is a block diagram illustrating another data processing apparatus for a neural network accelerator according to an embodiment of the present disclosure.

Modules 1010 to 1030 in FIG. 10 have the same function and structure with modules 610 to 630 in FIG. 6.

Figure 11:
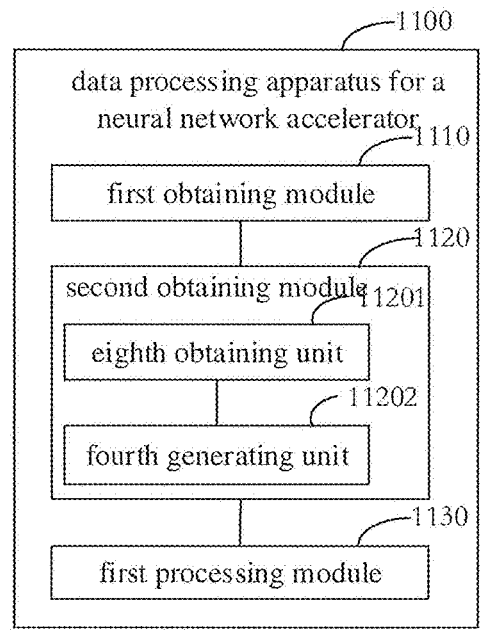
FIG. 11 is a block diagram illustrating another data processing apparatus for a neural network accelerator according to an embodiment of the present disclosure.

In an embodiment of the present disclosure, as illustrated in FIG. 11, the first operation is a real-number convolution operation. The second obtaining module 1120 includes: an eighth obtaining unit 11201, configured to obtain at least one weight matrix of the real-number convolution operation; and a fourth generative unit 11201, configured to determine a real-number full-connection operation based on the at least one weight matrix.

Modules 1110 to 1030 in FIG. 11 have the same function and structure with modules 610 to 630 in FIG. 6.

According to the data processing apparatus for a neural network accelerator in embodiments of the present disclosure, to-be-processed data and a corresponding to-be-executed operation are obtained, a real-number full-connection operation corresponding to the to-be-executed operation is obtained, and the real-number full-connection operation on the to-be-processed data is performed according to a real-number full-connection unit of the neural network accelerator to obtain a result of the to-be-executed operation for the to-be-processed data. In this way, any operation of the to-be-processed data may be implemented by the real-number full-connection unit of the neural network accelerator, thereby achieving reuse of the real-number full-connection unit and performing multiple operations in the case of minimum hardware logics.

In the embodiment of the present disclosure, an electronic device, a readable storage medium and a computer program product are further provided according to embodiments of the present disclosure.

Figure 12:
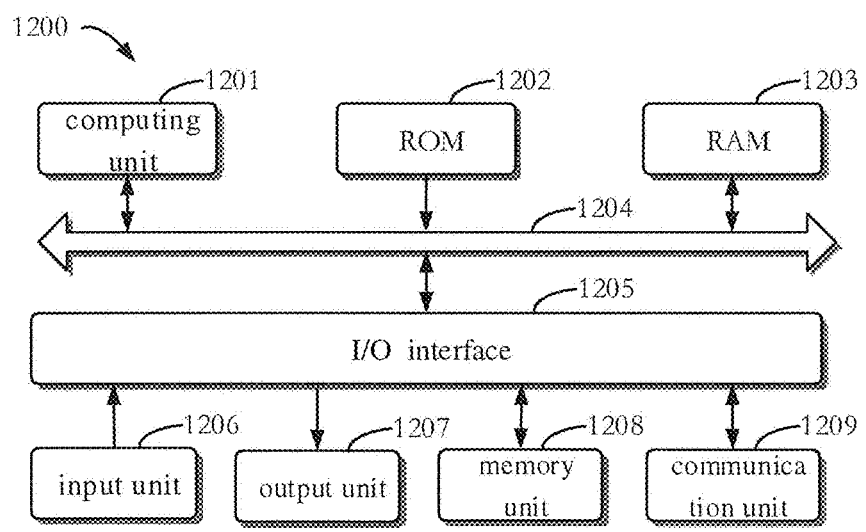
FIG. 12 is a block diagram illustrating an electronic device for implementing a data processing method for a neural network accelerator according to an embodiment of the present disclosure.

FIG. 12 is a block diagram illustrating an electronic device for implementing a data processing method for a neural network accelerator according to the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 12, the device 1200 includes a computing unit 1201, which may be configured to execute various appropriate actions and processes according to a computer program stored in a read-only memory (ROM) 1202 or loaded from a memory unit 808 to a random access memory (RAM) 1203. In a RAM 1203, various programs and data required for a device 1200 may be stored. A computing unit 1201, a ROM 1202 and a RAM 1203 may be connected with each other by a bus 1204. An input/output (I/O) interface 1205 is also connected to a bus 1204.

A plurality of components in the device 1200 are connected to an I/O interface 1205, and includes: an input unit 1206, for example, a keyboard, a mouse, etc.; an output unit 1207, for example various types of displays, speakers; a memory unit 1208, for example a magnetic disk, an optical disk; and a communication unit 1209, for example, a network card, a modem, a wireless transceiver. A communication unit 1209 allows a device 1200 to exchange information/data through a computer network such as internet and/or various types of telecommunication networks and other devices.

A computing unit 1201 may be various types of general and/or dedicated processing components with processing and computing ability. Some examples of a computing unit 1201 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1201 executes various methods and processings as described above, for example, a data processing method for a neural network accelerator. For example, in some embodiments, data processing of a neural network accelerator may be further implemented as a computer software program, which is physically contained in a machine readable medium, such as a memory unit 1208. In some embodiments, a part or all of the computer program may be loaded and/or installed on the device 1200 through a ROM 1202 and/or a communication unit 1209. When the computer program is loaded on a RAM 1203 and executed by a computing unit 1201, one or more blocks in the data processing method for a neural network accelerator as described above may be performed. In at least one embodiment, in other embodiments, a computing unit 1201 may be configured to execute the data processing method for a neural network accelerator in other appropriate ways (for example, by virtue of a firmware).

Various implementation modes of systems and technologies described herein may be implemented in a digital electronic circuit system, an integrated circuit system, a field programmable gate matrix (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a RAM, a ROM, an electrically programmable read-only memory (an EPROM) or a flash memory, an optical fiber device, and a compact disc read-only memory (CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a Local Area Network (LAN), a Wide Area Network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be noted that, Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A data processing method for a neural network accelerator, comprising:
    obtaining data to be processed and a first operation to be executed, wherein the data to be processed is voice frequency domain data, in which the voice frequency domain data is data obtained by frequency domain conversion of voice data;
    obtaining a real-number full-connection operation corresponding to the first operation; and
    performing the real-number full-connection operation on the data based on a real-number full-connection unit of the neural network accelerator to obtain a result of the first operation for the data, so that hardware logics of the neural network accelerator is minimized;
    wherein the first operation is a complex convolution operation; and
    wherein obtaining the real-number full-connection operation corresponding to the first operation comprises:
    obtaining a complex weight matrix corresponding to the complex convolution operation;
    splitting the complex weight matrix to obtain a real part weight matrix and an imaginary part weight matrix;
    determining a real-part full-connection operation based on the real part weight matrix, and determining an imaginary-part full-connection operation based on the imaginary part weight matrix; and
    combining the real-part full-connection operation and the imaginary-part full-connection operation to obtain the real-number full-connection operation.

2. The method of claim 1, wherein, performing the real-number full-connection operation on the data based on a real-number full-connection unit of the neural network accelerator to obtain a result of the first operation for the data, comprises:
    performing the real-part full-connection operation on the data based on the real-number full-connection unit to obtain a real part result;
    performing the imaginary-part full-connection operation on the data based on the real-number full-connection unit to obtain an imaginary part result; and
    generating the result based on the real part result and the imaginary part result.

3. The method of claim 1, wherein, further comprising:
    in response to an input mode of the data not being a preset input mode, changing the input mode of the data into the preset input mode.

4. The method of claim 1, wherein, the first operation is a complex full-connection operation, obtaining a real-number full-connection operation corresponding to the first operation, comprises:
    obtaining a complex weight matrix corresponding to the complex full-connection operation;
    splitting the complex weight matrix to obtain a real part weight matrix and an imaginary part weight matrix;
    determining a real-part full-connection operation based on the real part weight matrix, and determining an imaginary-part full-connection operation based on the imaginary part weight matrix; and
    combining the real-part full-connection operation with the imaginary-part full-connection operation to obtain the real-number full-connection operation.

5. The method of claim 1, wherein, the first operation is a real-number group convolution operation, obtaining a real-number full-connection operation corresponding to the first operation, comprises:
    obtaining a first weight matrix of the real-number group convolution operation;
    processing the first weight matrix to obtain a second weight matrix corresponding to a real-number convolution operation corresponding to the real-number group convolution operation; and
    determining the real-number full-connection operation based on the second weight matrix.

6. The method of claim 1, wherein, the first operation is a real-number convolution operation, obtaining a real-number full-connection operation corresponding to the first operation, comprises:
    obtaining at least one weight matrix corresponding to the real-number convolution operation; and
    determining at least one real-number full-connection operation based on the at least one weight matrix.

7. An electronic device, comprising:
    at least one processor; and
    a memory communicatively coupled to the at least one processor; wherein,
    the memory stores instructions executable by the at least one processor, wherein the instructions are executed by the at least one processor, the at least one processor is caused to execute the data processing method for a neural network accelerator, comprising:
    obtaining data to be processed and a first operation to be executed, wherein the data to be processed is voice frequency domain data, in which the voice frequency domain data is data obtained by frequency domain conversion of voice data;
    obtaining a real-number full-connection operation corresponding to the first operation; and
    performing the real-number full-connection operation on the data based on a real-number full-connection unit of the neural network accelerator to obtain a result of the first operation for the data, so that hardware logics of the neural network accelerator is minimized;

wherein the first operation is a complex convolution operation; and wherein obtaining the real-number full-connection operation corresponding to the first operation comprises:

obtaining a complex weight matrix corresponding to the complex convolution operation;

splitting the complex weight matrix to obtain a real part weight matrix and an imaginary part weight matrix;

determining a real-part full-connection operation based on the real part weight matrix, and determining an imaginary-part full-connection operation based on the imaginary part weight matrix; and combining the real-part full-connection operation and the imaginary-part full-connection operation to obtain the real-number full-connection operation.

8. The device of claim 7, wherein, performing the real-number full-connection operation on the data based on a real-number full-connection unit of the neural network accelerator to obtain a result of the first operation for the data, comprises:

performing the real-part full-connection operation on the data based on the real-number full-connection unit to obtain a real part result;

performing the imaginary-part full-connection operation on the data based on the real-number full-connection unit to obtain an imaginary part result; and generating the result based on the real part result and the imaginary part result.

9. The device of claim 7, wherein, the at least one processor is further configured to perform:

in response to an input mode of the data not being a preset input mode, changing the input mode of the data into the preset input mode.

10. The device of claim 7, wherein, the first operation is a complex full-connection operation, obtaining a real-number full-connection operation corresponding to the first operation, comprises:

obtaining a complex weight matrix corresponding to the complex full-connection operation;

splitting the complex weight matrix to obtain a real part weight matrix and an imaginary part weight matrix;

determining a real-part full-connection operation based on the real part weight matrix, and determining an imaginary-part full-connection operation based on the imaginary part weight matrix; and combining the real-part full-connection operation with the imaginary-part full-connection operation to obtain the real-number full-connection operation.

11. The device of claim 7, wherein, the first operation is a real-number group convolution operation, obtaining a real-number full-connection operation corresponding to the first operation, comprises:

obtaining a first weight matrix of the real-number group convolution operation;

processing the first weight matrix to obtain a second weight matrix corresponding to a real-number convolution operation corresponding to the real-number group convolution operation; and determining the real-number full-connection operation based on the second weight matrix.

12. The device of claim 7, wherein, the first operation is a real-number convolution operation, obtaining a real-number full-connection operation corresponding to the first operation, comprises:

obtaining at least one weight matrix corresponding to the real-number convolution operation; and determining at least one real-number full-connection operation based on the at least one weight matrix.

13. A non-transitory computer-readable storage medium storing computer instructions, wherein the computer instructions are configured to cause a computer to execute the data processing method for a neural network accelerator, comprising:

obtaining data to be processed and a first operation to be executed, wherein the data to be processed is voice frequency domain data, in which the voice frequency domain data is data obtained by frequency domain conversion of voice data;

obtaining a real-number full-connection operation corresponding to the first operation; and performing the real-number full-connection operation on the data based on a real-number full-connection unit of the neural network accelerator to obtain a result of the first operation for the data, so that hardware logics of the neural network accelerator is minimized;

wherein the first operation is a complex convolution operation; and wherein obtaining the real-number full-connection operation corresponding to the first operation comprises:

obtaining a complex weight matrix corresponding to the complex convolution operation;

splitting the complex weight matrix to obtain a real part weight matrix and an imaginary part weight matrix;

determining a real-part full-connection operation based on the real part weight matrix, and determining an imaginary-part full-connection operation based on the imaginary part weight matrix; and combining the real-part full-connection operation and the imaginary-part full-connection operation to obtain the real-number full-connection operation.

14. The storage medium of claim 13, wherein, performing the real-number full-connection operation on the data based on a real-number full-connection unit of the neural network accelerator to obtain a result of the first operation for the data, comprises:

performing the real-part full-connection operation on the data based on the real-number full-connection unit to obtain a real part result;

performing the imaginary-part full-connection operation on the data based on the real-number full-connection unit to obtain an imaginary part result; and generating the result based on the real part result and the imaginary part result.

15. The storage medium of claim 13, wherein, the at least one processor is further configured to perform:

in response to an input mode of the data not being a preset input mode, changing the input mode of the data into the preset input mode.

16. The storage medium of claim 13, wherein, the first operation is a complex full-connection operation, obtaining a real-number full-connection operation corresponding to the first operation, comprises:

obtaining a complex weight matrix corresponding to the complex full-connection operation;

splitting the complex weight matrix to obtain a real part weight matrix and an imaginary part weight matrix;

determining a real-part full-connection operation based on the real part weight matrix, and determining an imaginary-part full-connection operation based on the imaginary part weight matrix; and combining the real-part full-connection operation with the imaginary-part full-connection operation to obtain the real-number full-connection operation.

17. The storage medium of claim 13, wherein, the first operation is a real-number group convolution operation, obtaining a real-number full-connection operation corresponding to the first operation, comprises:
- obtaining a first weight matrix of the real-number group convolution operation;
- processing the first weight matrix to obtain a second weight matrix corresponding to a real-number convolution operation corresponding to the real-number group convolution operation; and
- determining the real-number full-connection operation based on the second weight matrix.

* * * * *